US009191997B2

(12) United States Patent
Weiβ

(10) Patent No.: US 9,191,997 B2
(45) Date of Patent: Nov. 17, 2015

(54) ELECTRICAL CONDUCTOR

(75) Inventor: Michael Weiβ, Benediktbeuern (DE)

(73) Assignee: GENTHERM GMBH, Odelzhausen (DE)

( * ) Notice: Subject to any disclaimer, the term of this patent is extended or adjusted under 35 U.S.C. 154(b) by 474 days.

(21) Appl. No.: 13/267,222

(22) Filed: Oct. 6, 2011

(65) Prior Publication Data

US 2012/0091112 A1    Apr. 19, 2012

(30) Foreign Application Priority Data

Oct. 19, 2010 (DE) .......................... 10 2010 048 695

(51) Int. Cl.
| | | |
|---|---|---|
| H05B 1/00 | (2006.01) |
| H05B 3/00 | (2006.01) |
| H05B 11/00 | (2006.01) |
| B60L 1/02 | (2006.01) |
| H05B 3/56 | (2006.01) |
| B60N 2/56 | (2006.01) |
| H05B 3/34 | (2006.01) |

(52) U.S. Cl.
CPC ............... *H05B 3/56* (2013.01); *B60N 2/5685* (2013.01); *H05B 3/342* (2013.01); *H05B 2203/011* (2013.01); *H05B 2203/015* (2013.01)

(58) Field of Classification Search
CPC ........ B60N 2/5685; H05B 3/342; H05B 3/56; H05B 2203/011; H05B 2203/015
USPC ........................ 219/202, 211, 212, 217, 201
See application file for complete search history.

(56) References Cited

U.S. PATENT DOCUMENTS

| | | | |
|---|---|---|---|
| 1,475,912 A | 11/1923 | Williams | |
| 1,553,461 A | 9/1925 | Negromanti | |
| 2,409,421 A | 10/1946 | Dufault | |
| 2,935,719 A * | 5/1960 | Chase | .......................... 338/330 |
| 2,978,972 A | 4/1961 | Hake | |
| 3,221,145 A | 11/1965 | Hager | |
| 3,287,684 A | 11/1966 | Armbruster | |
| 3,448,246 A | 6/1969 | Armbruster | |
| 3,500,014 A | 3/1970 | Longo | |
| 3,721,799 A | 3/1973 | Carlstrom | |
| 3,877,788 A | 4/1975 | Spargue et al. | |
| 3,892,946 A | 7/1975 | Rimmi | |

(Continued)

FOREIGN PATENT DOCUMENTS

| | | |
|---|---|---|
| AT | 004756 U2 | 8/2001 |
| CA | 2393970 | 6/2001 |

(Continued)

OTHER PUBLICATIONS

Automotive Heated Seats—Heated Steering Wheels, IGB Automotive Ltd., received by Assignee W.E.T. Automotive Systems, May 2003.

(Continued)

*Primary Examiner* — Dana Ross
*Assistant Examiner* — Lindsey C. Teaters
(74) *Attorney, Agent, or Firm* — The Dobrusin Law Firm, P.C.

(57) ABSTRACT

The present invention relates to an electrical conductor, which is formed at least in part of an electrically conductive material, and is at least in part coated with a protective layer that at least locally has a lower electrical conductivity than the electrically conductive material of the conductor.
It is envisioned that the protective layer is formed at least in part of synthetic rubber.

20 Claims, 3 Drawing Sheets

(56) References Cited

U.S. PATENT DOCUMENTS

Figure 1:
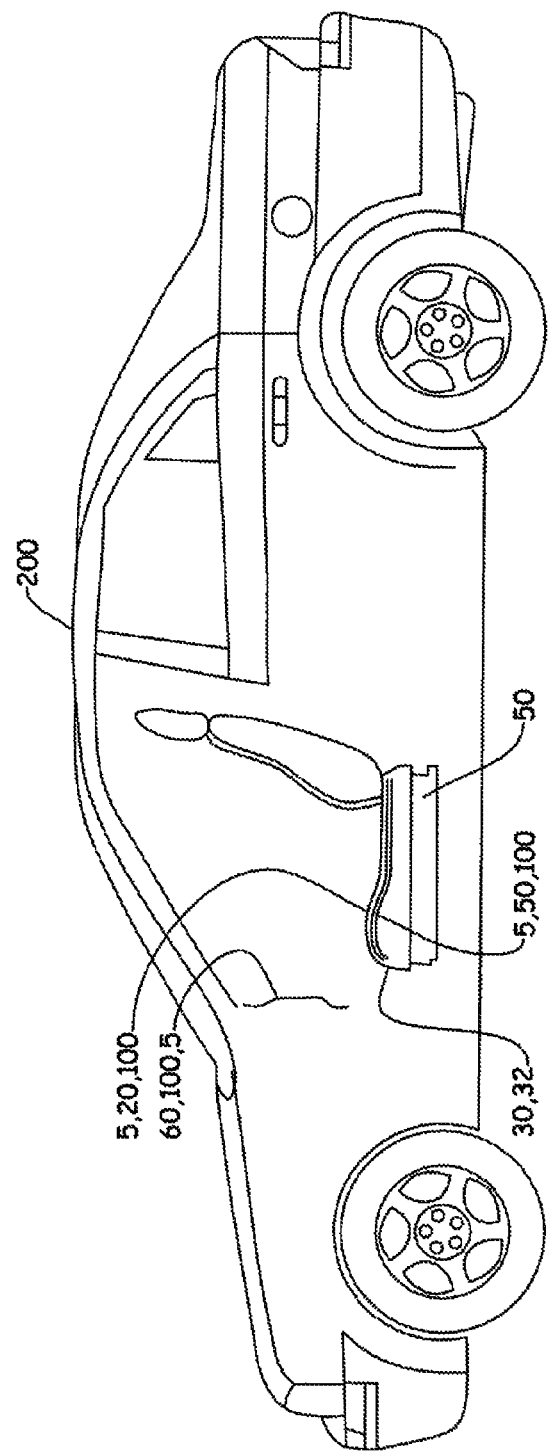

| | | |
|---|---|---|
| 4,032,752 A | 6/1977 | Ohmura et al. |
| 4,044,221 A | 8/1977 | Kuhn |
| 4,149,066 A | 4/1979 | Niibe |
| 4,245,149 A | 1/1981 | Fairlie |
| 4,247,756 A | 1/1981 | Cucinotta et al. |
| 4,335,725 A | 6/1982 | Geldmacher |
| 4,399,347 A | 8/1983 | Schmitt |
| 4,410,790 A | 10/1983 | Berf et al. |
| 4,436,986 A | 3/1984 | Carlson |
| 4,523,085 A | 6/1985 | Grise |
| 4,533,821 A | 8/1985 | Sato |
| 4,539,051 A | 9/1985 | Hacias |
| 4,542,285 A | 9/1985 | Grise |
| 4,626,664 A | 12/1986 | Grise |
| 4,628,187 A | 12/1986 | Sekiguchi et al. |
| 4,633,068 A | 12/1986 | Grise |
| 4,656,339 A | 4/1987 | Grise |
| 4,661,689 A | 4/1987 | Harrison |
| 4,665,304 A | 5/1987 | Spencer |
| 4,713,531 A | 12/1987 | Fennekels et al. |
| 4,719,335 A | 1/1988 | Batliwalla et al. |
| 4,725,717 A | 2/1988 | Harrison |
| 4,743,741 A | 5/1988 | Ramus |
| 4,752,672 A | 6/1988 | Grise |
| 4,761,541 A | 8/1988 | Batliwalla et al. |
| 4,777,351 A | 10/1988 | Batliwalla et al. |
| 4,845,343 A | 7/1989 | Aune et al. |
| 4,849,255 A | 7/1989 | Grise et al. |
| 4,857,711 A | 8/1989 | Watts |
| 4,868,898 A | 9/1989 | Seto |
| 4,888,089 A | 12/1989 | Marstiller et al. |
| 4,892,998 A | 1/1990 | Marstiller et al. |
| 4,912,306 A | 3/1990 | Grise et al. |
| 4,923,248 A | 5/1990 | Feher |
| 4,931,627 A | 6/1990 | Watts |
| 4,964,674 A | 10/1990 | Altmann et al. |
| 5,015,824 A | 5/1991 | Monter et al. |
| 5,019,797 A | 5/1991 | Marstiller et al. |
| 5,025,136 A | 6/1991 | Doege et al. |
| 5,034,594 A | 7/1991 | Beezhold et al. |
| 5,045,673 A | 9/1991 | Kelly |
| 5,057,674 A | 10/1991 | Smith-Johannsen |
| 5,081,339 A | 1/1992 | Stine |
| 5,111,025 A | 5/1992 | Barma et al. |
| 5,132,840 A | 7/1992 | Okada et al. |
| 5,155,334 A | 10/1992 | Marstiller et al. |
| 5,181,006 A | 1/1993 | Shafe et al. |
| 5,187,350 A | 2/1993 | Tsuchiya |
| 5,197,595 A | 3/1993 | Coultas |
| 5,198,639 A | 3/1993 | Smuckler |
| 5,206,482 A | 4/1993 | Smuckler |
| 5,335,381 A | 8/1994 | Chang |
| 5,344,591 A | 9/1994 | Smuckler |
| 5,354,966 A | 10/1994 | Sperbeck |
| 5,405,178 A | 4/1995 | Weingarten et al. |
| 5,414,241 A | 5/1995 | Ohashi et al. |
| 5,418,025 A | 5/1995 | Harmand et al. |
| 5,422,462 A | 6/1995 | Kishimoto |
| 5,432,322 A | 7/1995 | Ingram et al. |
| 5,451,747 A | 9/1995 | Sullivan et al. |
| 5,477,033 A | 12/1995 | Bergholtz |
| 5,516,189 A | 5/1996 | Ligeras |
| 5,543,601 A | 8/1996 | Bartrug et al. |
| 5,626,021 A | 5/1997 | Karunasiri et al. |
| 5,643,480 A | 7/1997 | Gustavsson et al. |
| 5,679,277 A | 10/1997 | Niibe et al. |
| 5,702,565 A | 12/1997 | Wu et al. |
| 5,716,536 A | 2/1998 | Yokoto et al. |
| 5,796,044 A | 8/1998 | Cobian et al. |
| 5,800,483 A | 9/1998 | Vought |
| 5,800,595 A | 9/1998 | Wright |
| 5,801,914 A | 9/1998 | Thrash |
| 5,824,993 A | 10/1998 | Chrysochoos et al. |
| 5,824,994 A | 10/1998 | Noda et al. |
| 5,824,996 A | 10/1998 | Kochman et al. |
| 5,851,588 A | 12/1998 | Uthoff, Jr. |
| 5,861,610 A | 1/1999 | Weiss |
| 5,897,162 A | 4/1999 | Humes et al. |
| 5,902,505 A | 5/1999 | Finley |
| 5,904,874 A | 5/1999 | Winter |
| 5,921,314 A | 7/1999 | Schuller et al. |
| 5,948,297 A | 9/1999 | Haubner et al. |
| 5,961,869 A | 10/1999 | Irgens |
| 6,006,663 A * | 12/1999 | Kropp et al. .................. 101/216 |
| 6,031,214 A | 2/2000 | Bost et al. |
| 6,054,690 A | 4/2000 | Petit et al. |
| 6,057,530 A | 5/2000 | Gurevich |
| 6,064,037 A | 5/2000 | Weiss et al. |
| 6,070,115 A | 5/2000 | Oestreicher et al. |
| 6,084,217 A | 7/2000 | Bulgajewski |
| 6,093,910 A | 7/2000 | McClintock et al. |
| 6,097,009 A | 8/2000 | Cole |
| 6,111,234 A | 8/2000 | Batliwalla et al. |
| 6,124,577 A | 9/2000 | Fristedt |
| 6,143,206 A | 11/2000 | Handa et al. |
| 6,147,332 A | 11/2000 | Holmberg et al. |
| 6,150,642 A | 11/2000 | Weiss et al. |
| 6,164,719 A | 12/2000 | Rauh |
| 6,172,344 B1 | 1/2001 | Gordon et al. |
| 6,189,487 B1 | 2/2001 | Owen et al. |
| 6,194,692 B1 | 2/2001 | Oberle |
| 6,215,111 B1 | 4/2001 | Rock et al. |
| 6,220,659 B1 | 4/2001 | McDowell et al. |
| 6,229,123 B1 | 5/2001 | Kochman et al. |
| 6,278,090 B1 | 8/2001 | Fristedt et al. |
| 6,294,758 B1 | 9/2001 | Masao et al. |
| 6,307,188 B1 | 10/2001 | Bulgajewski |
| 6,369,369 B2 | 4/2002 | Kochman et al. |
| 6,415,501 B1 | 7/2002 | Schlesselman |
| 6,423,951 B1 | 7/2002 | Elsasser |
| 6,426,485 B1 | 7/2002 | Bulgajewski et al. |
| 6,439,658 B1 | 8/2002 | Ganz et al. |
| 6,452,138 B1 | 9/2002 | Kochman et al. |
| 6,455,823 B1 | 9/2002 | Bulgajewski |
| 6,495,809 B2 | 12/2002 | Bulgajewski et al. |
| 6,501,055 B2 | 12/2002 | Rock et al. |
| 6,512,203 B2 | 1/2003 | Jones et al. |
| 6,559,422 B2 | 5/2003 | Burt |
| RE38,128 E | 6/2003 | Gallup et al. |
| 6,619,736 B2 | 9/2003 | Stowe et al. |
| 6,629,724 B2 | 10/2003 | Ekern et al. |
| 6,664,512 B2 | 12/2003 | Horey et al. |
| 6,664,518 B2 | 12/2003 | Fristedt et al. |
| 6,676,207 B2 | 1/2004 | Rauh et al. |
| 6,686,562 B1 | 2/2004 | Weiss et al. |
| 6,710,303 B1 | 3/2004 | Lorenzen |
| 6,713,733 B2 | 3/2004 | Kochman et al. |
| 6,838,647 B2 | 1/2005 | Nagele |
| 6,840,576 B2 | 1/2005 | Ekern et al. |
| 6,857,697 B2 | 2/2005 | Brennan et al. |
| 6,869,139 B2 | 3/2005 | Brennan et al. |
| 6,869,140 B2 | 3/2005 | White et al. |
| 6,872,882 B2 | 3/2005 | Fritz |
| 6,884,965 B2 | 4/2005 | Nelson et al. |
| 6,892,807 B2 | 5/2005 | Fristedt et al. |
| 6,893,086 B2 | 5/2005 | Bajic et al. |
| 6,906,293 B2 | 6/2005 | Schmiz et al. |
| 6,976,734 B2 | 12/2005 | Stoewe |
| 7,019,260 B1 | 3/2006 | Degand et al. |
| 7,036,283 B2 | 5/2006 | Halas |
| 7,040,710 B2 | 5/2006 | White et al. |
| 7,052,091 B2 | 5/2006 | Bajic et al. |
| 7,053,344 B1 | 5/2006 | Surjan et al. |
| 7,083,227 B2 | 8/2006 | Brennan et al. |
| 7,100,978 B2 | 9/2006 | Ekern et al. |
| 7,131,689 B2 | 11/2006 | Brennan et al. |
| 7,147,279 B2 | 12/2006 | Bevan et al. |
| 7,168,758 B2 | 1/2007 | Bevan et al. |
| 7,185,716 B2 | 3/2007 | Bloom et al. |
| 7,202,444 B2 | 4/2007 | Bulgajewski |
| 7,205,510 B2 | 4/2007 | Howick |
| 7,213,876 B2 | 5/2007 | Stoewe |
| 7,223,948 B2 | 5/2007 | Howick et al. |
| 7,285,748 B2 | 10/2007 | Nelson et al. |

(56) References Cited

U.S. PATENT DOCUMENTS

| | | |
|---|---|---|
| 7,301,441 B2 | 11/2007 | Inada et al. |
| 7,306,283 B2 | 12/2007 | Howick et al. |
| 7,338,117 B2 | 3/2008 | Iqbal et al. |
| 7,356,912 B2 | 4/2008 | Iqbal et al. |
| 7,370,911 B2 | 5/2008 | Bajic et al. |
| 7,475,938 B2 | 1/2009 | Stoewe et al. |
| 7,478,869 B2 | 1/2009 | Lazanja et al. |
| 7,500,536 B2 | 3/2009 | Bulgajewski et al. |
| 7,506,938 B2 | 3/2009 | Brennan et al. |
| 7,510,239 B2 | 3/2009 | Stowe |
| 7,560,670 B2 | 7/2009 | Lorenzen et al. |
| 7,569,795 B2 | 8/2009 | Ferguson |
| 7,587,901 B2 | 9/2009 | Petrovski |
| 7,618,089 B2 | 11/2009 | Stoewe et al. |
| 7,637,569 B2 | 12/2009 | Krobok et al. |
| 7,714,256 B2 | 5/2010 | Weiss |
| 7,741,582 B2 | 6/2010 | Howick et al. |
| 7,838,804 B2 | 11/2010 | Krobok |
| 8,106,338 B2 | 1/2012 | Weiss |
| 8,198,569 B2 | 6/2012 | Krpbok et al. |
| 8,253,071 B2 | 8/2012 | Weiss |
| 8,288,693 B2 | 10/2012 | Weiss et al. |
| 2002/0117495 A1 | 8/2002 | Kochman et al. |
| 2004/0021346 A1 | 2/2004 | Morinet et al. |
| 2004/0065656 A1 | 4/2004 | Inagawa et al. |
| 2004/0100131 A1 | 5/2004 | Howick et al. |
| 2005/0004271 A1* | 1/2005 | Hong .............................. 523/440 |
| 2005/0040158 A1 | 2/2005 | Bamy Bamy et al. |
| 2005/0115956 A1 | 6/2005 | Wong |
| 2005/0184565 A1* | 8/2005 | Weiss et al. .............. 297/180.15 |
| 2005/0242081 A1 | 11/2005 | Howick |
| 2006/0015801 A1 | 1/2006 | Suh et al. |
| 2006/0138810 A1 | 6/2006 | Knoll et al. |
| 2006/0158011 A1 | 7/2006 | Marlovits et al. |
| 2006/0289422 A1 | 12/2006 | Seifert |
| 2007/0176471 A1 | 8/2007 | Knoll |
| 2007/0246120 A1 | 10/2007 | Krobok et al. |
| 2008/0011732 A1 | 1/2008 | Ito et al. |
| 2008/0290080 A1* | 11/2008 | Weiss .......................... 219/202 |
| 2009/0151467 A1 | 6/2009 | Heimerl |
| 2009/0184107 A1 | 7/2009 | Weiss |
| 2009/0218855 A1 | 9/2009 | Wolas |
| 2010/0035356 A1 | 2/2010 | Shalyt et al. |
| 2010/0038356 A1 | 2/2010 | Fukuda et al. |
| 2010/0038357 A1 | 2/2010 | Fukuda et al. |
| 2010/0219664 A1 | 9/2010 | Howick et al. |
| 2010/0326976 A1 | 12/2010 | Nakajima et al. |
| 2011/0041475 A1* | 2/2011 | Hicken et al. .................... 60/253 |
| 2011/0049131 A1 | 3/2011 | Sturgess |
| 2011/0147357 A1 | 6/2011 | Bokelmann et al. |
| 2011/0226751 A1 | 9/2011 | Lazanja et al. |
| 2011/0240751 A1 | 10/2011 | Rauh et al. |
| 2011/0290362 A1* | 12/2011 | Weil et al. ....................... 138/129 |
| 2011/0290775 A1 | 12/2011 | Cubon et al. |
| 2012/0013433 A1 | 1/2012 | Rauh et al. |

FOREIGN PATENT DOCUMENTS

| | | |
|---|---|---|
| DE | 2157356 A1 | 5/1973 |
| DE | 3513909 A1 | 10/1986 |
| DE | 3938951 A1 | 5/1990 |
| DE | 4020580 A1 | 1/1992 |
| DE | 4124654 A1 | 1/1993 |
| DE | 19638372 A1 | 3/1997 |
| DE | 199 20 451 A1 | 12/1999 |
| DE | 10112405 A1 | 10/2001 |
| DE | 10027173 A1 | 12/2001 |
| DE | 10206336 A1 | 9/2003 |
| DE | 202004011968 U1 | 11/2004 |
| DE | 102004045875 A1 | 10/2005 |
| DE | 102011114949 A1 | 4/2012 |
| EP | 0202896 A2 | 11/1986 |
| EP | 1783785 A | 5/2007 |
| FR | 2263657 A | 10/1975 |
| FR | 2301989 A1 | 9/1976 |
| GB | 2010650 A | 6/1979 |
| JP | 56093284 A | 7/1981 |
| JP | 57134655 A | 8/1982 |
| JP | 62109385 A | 7/1987 |
| JP | 11-024493 A | 1/1999 |
| JP | 11-218336 A | 8/1999 |
| JP | 2000/333781 A | 12/2000 |
| JP | 2001/217058 A | 8/2001 |
| JP | 2002/050459 A | 2/2002 |
| JP | 2003/332030 A | 11/2003 |
| JP | 2004/055219 A | 2/2004 |
| WO | 89/05391 A1 | 5/1989 |
| WO | 8906480 A1 | 7/1989 |
| WO | 94/09684 A1 | 5/1994 |
| WO | 9701549 A1 | 1/1997 |
| WO | 00/11443 A1 | 3/2000 |
| WO | 01/43507 A1 | 6/2001 |
| WO | 01/89267 A1 | 11/2001 |
| WO | 02/06083 A1 | 1/2002 |
| WO | 02/06914 A1 | 1/2002 |
| WO | 03/101777 A | 9/2003 |
| WO | 2005/047056 A1 | 5/2005 |
| WO | 2005/089019 A2 | 9/2005 |
| WO | 2007/065424 A | 6/2007 |
| WO | 2009/049577 A1 | 4/2009 |
| WO | 2010/065411 A1 | 6/2010 |

OTHER PUBLICATIONS

Automotive Seat Heating Systems, Bauerhin International, received by Assignee W.E.T. Automotive Systems, May 2002.

GMT 830 Heating & Ventilation System, IGB Automotive Ltd., received by Assignee W.E.T. Automotive Systems, Jun. 2003.

Related Patent Application, U.S. Appl. No. 10/715,160, filed Nov. 17, 2003, U.S. Pat. No. 7,306,283.

Related Patent Application, U.S. Appl. No. 11/923,091, filed Oct. 24, 2007, U.S. Pat. No. 7,741,582.

Related Patent Application, U.S. Appl. No. 12/778,238, filed May 12, 2010, published as 2010/0219664.

Related Patent Application, U.S. Appl. No. 09/642,167, filed Aug. 18, 2000; U.S. Pat. No. 6,686,562 issued Feb. 3, 2004.

Related Patent Application, U.S. Appl. No. 10/598,453, filed Jun. 12, 2007; published, as 2007-0278214 on Dec. 6, 2007; U.S. Pat. No. 8,288,093 issued on Oct. 16, 2012.

Related Patent Application, U.S. Appl. No, 11/800,669, filed May 7, 2007; published as 2007-0257027 on Nov. 8, 2007; U.S. Pat. No. 7,838,804 issued Nov. 23, 2010.

Related Patent Application, U.S. Appl. No. 11/803,486, filed May 15, 2007; published as 2007-0278210 on Dec. 6, 2007; U.S. Patent No. 7,714,256 issued May 11, 2010.

Related Patent Application, U.S. Appl. No. 12/752,591, filed Apr. 1, 2010; published as 2010-0187214 on Jul. 29, 2010: U.S. Pat. No. 8,106,338 issued Jan. 31, 2012.

Related Patent Application, U.S. Appl. No. 12/096,266, filed Jun. 5, 2008; published as 2008-0290080 on Nov. 27, 2008; U.S. Pat. No. 8,253,071 issued Aug. 28, 2012.

Related Patent Application, U.S. Appl. No. 12/333,649, filed Dec. 12, 2008; published as 2009-0151467 on Jun. 18, 2009.

Related Patent Application, U.S. Appl. No. 11/474,187, filed Jun. 23, 2006; published as 2006-0289422 on Dec. 28, 2006.

Related Patent Application, U.S. Appl. No. 11/189,369, filed Jul. 26, 2005; published as 2006-0027552 on Feb. 9, 2006, U.S. Pat. No. 8,198,569 issued Jun. 12, 2012.

Related Patent Application, U.S. Appl. No. 11/587,707, filed Jan. 4, 2007; published as 2007-0246120 on Oct. 25, 2007.

Related Patent Application, U.S. Appl. No. 10/497,599, filed Oct. 18, 2004; published as 2005-0040158 on Feb. 24, 2005.

Related Patent Application, U.S. Appl. No. 11/415,798, filed May 1, 2006; published as 2006-0196696 on Sep. 7, 2006; U.S. Pat. No. 7,185.716 issued Mar. 6, 2007.

Related Patent Application, U.S. Appl. No. 12/338,971, filed Dec. 18, 2008; published as 2009-0184107 on Jul. 23, 2009.

(56) References Cited

OTHER PUBLICATIONS

Related Patent Application, U.S. Appl. No. 12/963,030, filed Dec. 8, 2010; published as 2011-0147357 on Jun. 23, 2011.

Related Patent Application, U.S. Appl. No. 13/080,039, filed Apr. 5, 2011; published as 2011-0240751 on Oct. 6, 2011.

Related Patent Application, U.S. Appl. No. 13/181,600, filed July 13, 2011; published as 2012-00163433 on Jan. 19, 2012.

* cited by examiner

ELECTRICAL CONDUCTOR

CLAIM OF PRIORITY

The present application claims the benefit of the priority of the filing date of the German application, DE 102010048695.7 filed 19 Oct. 2010, which is herein incorporated by reference for all purposes.

FIELD OF INVENTION

This invention relates to an electrical conductor according to the preamble of claim 1 (An electrical conductor, formed at least in part of an electrically conductive material, and at least in part coated with a protective layer, which at least locally has a lower specific electrical conductivity than the electrically conductive material of the conductor) and to its use in heating elements, sensors, seats and vehicles.

PRIOR ART

It is known practice to silver-plate copper conductors in order to protect them against corrosion. However, unless the silver coating is impervious, the copper is still susceptible to attack. Moreover, the silver diffuses with time into the copper. This results in the formation of a boundary layer comprising a Ag—Cu alloy, which is extremely brittle. Fractures in this boundary layer form incipient cracks that likewise endanger the conductor.

Jacketed wires, as they are generally known, may be used to overcome this problem. In this case, electrical conductors are provided with a steel core and a copper jacket, as disclosed in DE 196 38 372 A1 or DE 102 06 336 A1. A jacketed wire comprising a platinum jacket and a core made of a material containing precious metal is known from DE 38 32 342 C1. A major disadvantage of this material combination is the high cost. Moreover, the corrosion resistance of copper jackets is not always sufficient for certain applications.

JP 2001-217058 discloses a heating conductor in which a plurality of carbon fibers is jacketed with heat-shrinkable tubing. However, an assembly of this kind is not very fracture-proof.

DE 20 2004 020 425.8 describes a conductor with a plastic core and a metallic, coating. The invention described here is intended to further improve the corrosion resistance of a conductor of this kind.

SUMMARY OF THE INVENTION

To enrich the prior art, an electrical conductor according to claim 1 is therefore proposed. Thanks to its special make-up, this conductor is protected against functional impairment by corrosion even when used in damp and saline environments. This is because a conductive protective layer imparts corrosion resistance and load capability.

Accordingly, pursuant to one aspect of the present invention, there is contemplated an electrical conductor, formed at least in part of an electrically conductive material, and at least in part coated with a protective layer, which at least locally has a lower specific electrical conductivity than the electrically conductive material of the conductor, characterized in that the protective layer is formed at least in part of synthetic rubber.

The invention may be further characterized by one or any combination of the features described herein, such as the electrical conductor has at least in part the form of a fabric, of a textile, of a nonwoven fabric, a knitted fabric, a film, a strand, a thread or a network and/or that the conductor is incorporated into a fabric, is fitted thereon and attached by means of an additional sewing or knitting yarn, such that it is embedded therein as sewing yarn, and/or that it is bonded at least to one fabric and/or is bonded between two fabrics and that at least one fabric is a textile, a film, a network and/or comprises a combination thereof, preferably substantially formed therefrom, and that the protective layer is applied at least to parts or components of the fabric; at least one electrical conductor has a particularly strand-like support made of a low electrically conductive material if necessary, in particular an electrically non-conductive material, preferably fibers or filaments made of plastic, in particular of PU, PP, PE, PA, PET, of a metallizable material, and/or of a material which is temperature resistant at least up to 75° C., preferably up to 150° C., preferably up to 300° C., preferably up to 500° C., preferably up to 1000° C.; the electrical conductor has a conductive layer, which is electrically conductive, which is formed at least in part from a metal, preferably at least in part from gold, silver, nickel, chromium, copper, platinum, nickel containing phosphorus fractions, from an alloy of the above materials and/or a material whose surface is passivated, oxidized to be passivated and/or chromated, and/or which has been applied galvanically onto the support and/or has a bonded connection with the support; at normal operating temperatures (about −20° C. to about 90° C.) the specific electrical conductivity of the conductive layer and/or of the electrically conductive components of the conductor and/or of the protective layer is between 100×106 S/m and 10-8 S/m, preferably between 62×106 S/m and 10-3 S/m, and the specific electrical conductivity of the protective layer is at least 10-fold, preferably 100-fold, preferably 1000-fold above the one of the conductive layer and/or the conductor (25) and its conductive components, respectively, preferably between 103 and 10-3 S/m; Electrical heating element, particularly for vehicle seats, characterized in that it has at least one electrical conductor; Sensor, in particular for monitoring a surface of a vehicle interior by touch and/or pressure, characterized in that at least one portion of the sensor, preferably at least one of its sensor electrodes has an electrical conductor, a fabric and/or a heating element; Seat, in particular for a vehicle, characterized in that it has an electrical conductor, a fabric, a heating element and/or a sensor; Vehicle, characterized in that it has an electrical conductor, a heating element, a sensor and/or a seat.

Further advantageous embodiments are evident from the dependent claims and the following description of the drawings.

DRAWINGS

Figure 2:
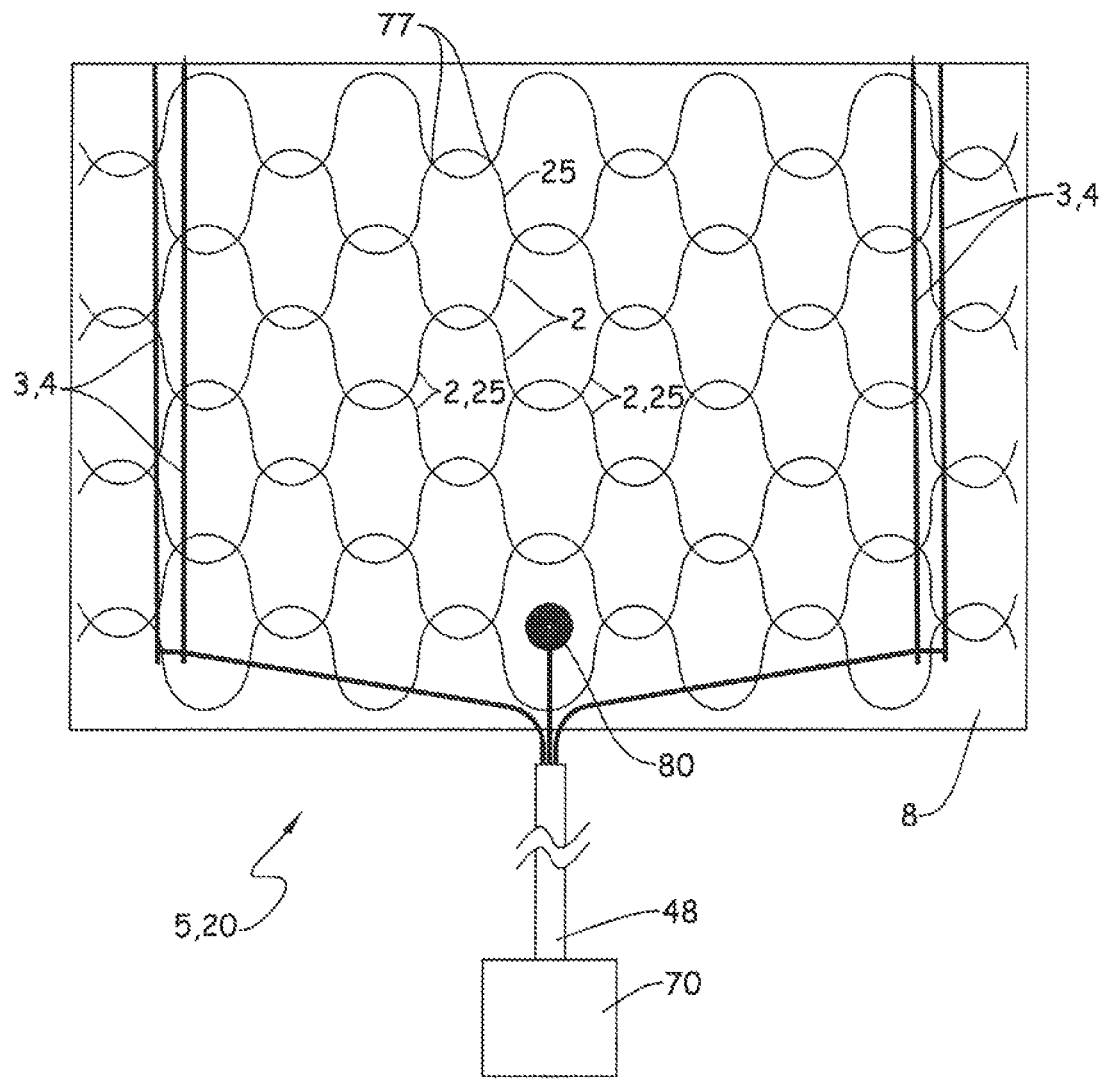

Details of the invention are explained in the following. These explanations are intended to elucidate the invention. However, they are only of exemplary nature. The scope of the invention naturally allows for one or more of the described features to be omitted, modified or augmented. And it goes without saying that the features of different embodiments can be combined with each other. Reference will be made hereinafter to:

FIG. 1 A partially cut-away side view of a vehicle with a heating element and sensor FIG. 2 Top view of an electric heating element according to FIG. 1

Figure 2A:
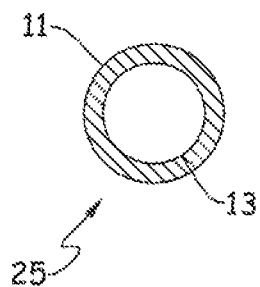

FIG. 2A Cross-sectional view of an electrical conductor

Figure 2B:
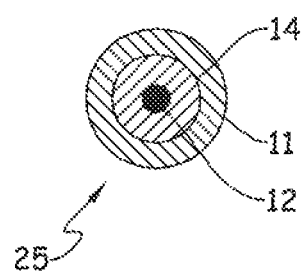

FIG. 2B Cross-sectional view of an electrical conductor

Figure 3:
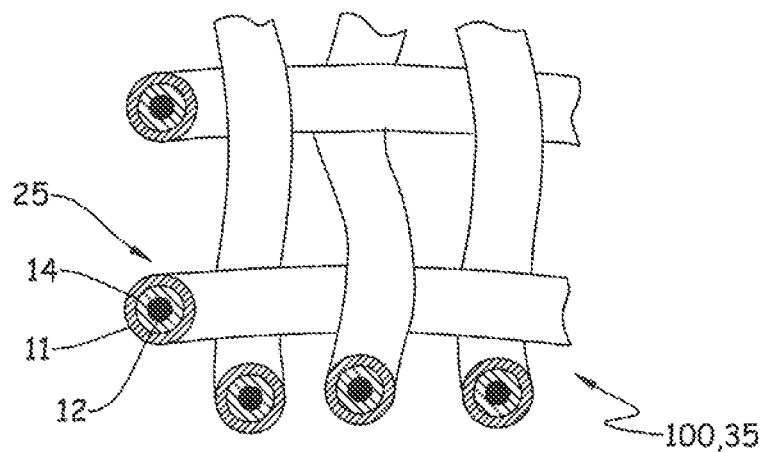

FIG. 3 Top view of an enlarged excerpt of a textile electrical conductor

Figure 4:
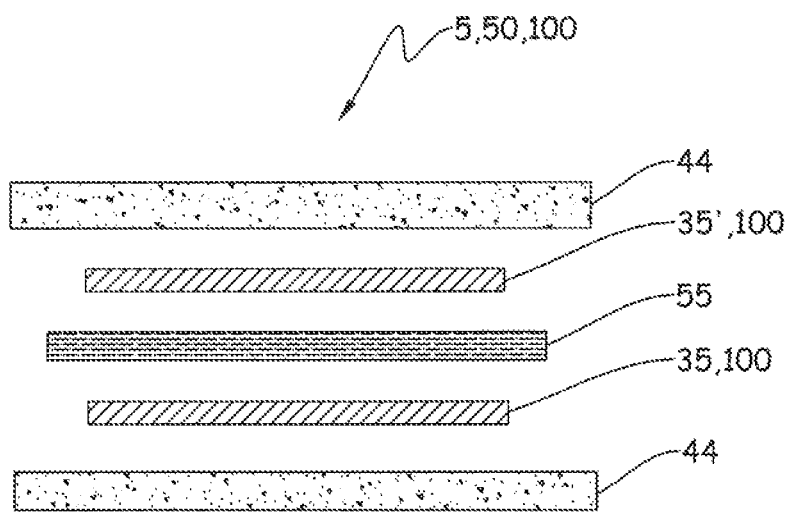

FIG. 4 Cross-section through a capacitive sensor with two textile electrodes

DESCRIPTION OF THE INVENTION

FIG. 1 shows a vehicle 200.

In it, various functional elements 5 may be provided, e.g. a seat heating, a seat-occupancy detection means or a keypad 60, which make a certain function such as heating, pressure detection or switching available pointwise or in two dimensions in certain zones of the vehicle interior.

To this end, at least one of the functional elements 5 is provided with at least one electrical conductor 25 according to FIG. 2, 2a, 2b or 3.

This conductor may be, for example, a heating conductor 2, a contact conductor 3, an electric cut-out and/or a connection line 48.

It is arranged in contact with, in or near to the functional zone, e.g. at least partially in contact with and/or in a seat cover 30.

It may be of planar configuration or, as in the embodiments of FIGS. 2 and 3, strand-shaped. A strand is a longish structure whose longitudinal dimensions by far exceed its cross-sectional dimensions. Preferably, the two cross-sectional dimensions are approximately the same size. The structure preferably has bending-elastic properties, but is in a solid state.

At least one conductor 25 may be configured as flat material 100, e.g. as film. In the embodiment of FIG. 2, a non-woven fabric of synthetic fibers is provided. Preferably, a plurality of conductors 25 is provided, which preferably meander beside one another and/or are connected up electrically in parallel. They are anchored to the non-woven fabric by sewing or knitting, for example. In the embodiment of FIG. 2, each conductor 25 is located at an average distance of about 2 cm from the next conductor 25, and runs approximately parallel thereto. "Parallel" means that the distance between two conductors remains, on average, about the same along their length.

It is also possible, according to FIG. 3, to provide a plurality of conductors 25, which together, at least in part, form a flat material 100.

A flat material 100 of such kind may feature, for example, a textile, a multiple- or single-thread knitted fabric, a woven or non-woven fabric, a flexible thermoplastic or an air-permeable material, and/or may be made up at least partially of such a material.

It is expedient if at least one electrical conductor 25 features at least one support 12 in order to increase the mechanical stability of the conductor 25. It may extend in several dimensions. Preferably, however, it runs in essentially two, or, as in FIGS. 2 and 3, in one main direction and is configured, for example, as the core of a conductor strand.

It may be to advantage that the support 12 is manufactured at least partially from a preferably elastic, temperature-stable and tear-resistant plastic, preferably at least partially, but more preferably entirely, from carbon fibers, polypropylene, a thermoplastic or polyamide and/or glass fiber, and/or at least partially from copper and/or from steel. The term "plastic" refers to every synthetic, non-naturally occurring material, in particular polymers and substances derived therefrom, such as carbon fibers.

It may be practical if the material of the support 12 is spinnable or capable of being drawn (out) into filaments or wires, preferably to filaments which are less than 100 µm thick, preferably less than 10 µm, preferably less than 1 µm, preferably less than 0.1 µm, preferably less than 0.01 µm.

It may be to advantage that a support for a conductor 25, in particular a heating conductor as in FIG. 2, is composed at least partially, essentially entirely, of a thermoplastic material, preferably a plastic, preferably polyamide, polyester, Kapton or, as here, polyimide. This permits a cost-effective assembly. Moreover, fibers of this kind are soft and neither pointed nor brittle. As a result, it is possible to operate neighboring systems (e.g. seat-occupancy detection) safely.

It may be to advantage that the electrical conductivity of at least one electrical conductor 25 is at least temporarily reduced if the temperature thereof, at least locally, is between 200° C. and 400° C., preferably between 220° C. and 280° C. By this means, the heating element's surroundings can be prevented from heating up to an impermissibly high temperature. It may be practical that at least part of, preferably substantially all of, the electrical conductor 25 is interrupted, preferably irreversibly, within the cited temperature range.

It may be to advantage that the electrical resistance of the electrical conductor 25 is between 0 and 3 Ω/m, preferably between 0 and 2 Ωm, preferably between 0.1 and 3 Ωm, preferably between 0.2 and 0.5 Ωm.

At least one electrical conductor 25 features at least one conducting layer 14.

This conducting layer 14 may be essentially planar, e.g. in the form of a film coating. However, the conducting layer 14 may also be configured as a coating layer that surrounds at least part of an internal strand, e.g. a filamentary support 12.

The term "layer" refers to any material configuration, especially flat materials, that extends predominantly in two dimensions and that preferably, but not necessarily, is flat and flexible. The material configuration preferably forms a continuous surface, but may also be perforated, e.g. like a knitted spacer fabric, netting, a tubular system or foam.

A coating layer is a layer which, directly or indirectly, sheaths, i.e. encases, at least part of an object but is not necessarily the outermost layer encasing the object.

Nickel, gold, silver, copper or a gold/silver alloy are particularly suitable materials for the conducting layer 14. These may be applied, in particular; by an electroplating process. The sheath is very ductile and thus highly flexural-fatigue resistant over a long service period.

The conducting layer 14 preferably has a thickness between about 0.01 µm and about 3 mm. Depending on the application and desired resistance, it is between 0.1 µm and 0.5 mm, preferably between 0.1 µm and 10 µm for heating conductors, for example, and between 5 µm and 1 mm for conductors of low total resistance, for example.

It is to advantage if the material of the conductor support 12 has greater flexural-fatigue resistance and/or lower tensile or compressive strength than the material of the conducting layer 14.

In the case of threads, for example, the conducting layer 14 may be applied before they are processed further. However, in the case of a finished article such as a textile, it may also be applied to one or more supports 12 by spraying or dipping.

At least part of at least one electrical conductor 25 is provided with a protective layer 11. The protective layer 11 is preferably composed at least partially of a material that is chemically, in particular electrochemically, only very slightly reactive. By this is meant that under normal operating conditions, this material essentially retains its chemical composition and its atomic structure. As a result, an underlying conducting layer 14 is protected against corrosion. The protective layer is preferably resistant to mechanical wear. It is applied, for example by extrusion, onto the conducting layer 14 and/or the conductor 25. It may also be applied as a lacquer. Lacquer is a liquid or powder-form coating material that is applied in a thin layer to objects and that hardens by means of chemical or physical processes (e.g. evaporation of the solvent) to form a continuous film. Powder lacquers, suspensions of lacquer particles in water, radiation-curing lacquer systems and polyurethane lacquers are especially suitable.

At least in parts, the protective layer 11 is composed of a material that is at least conditionally electrically conductive, preferably of a material that is chemically or electrochemically only very slightly reactive. Preferably, at least in parts, its electrical conductivity (especially its specific electrical conductivity) is lower than that of a conducting layer 14 of the conductor 25. Its resistance, at least in sections, in the transverse direction of the conductor 25 is preferably at least of a similar dimension as that of the conductor 25 in its longitudinal direction. As a result, electrolytic reactions are distributed uniformly over the entire conductor surface, and any current concentration at possible defects in the protective layer 11 are avoided. Suitable materials here include, for example, electrically conductive plastics (e.g. intrinsically conductive plastics), platinum, soot, graphite in the form of carbon, carbon fibers, nanotubes, diamond, stainless steel or passivated or oxidized metals. The electrically conductive material may constitute a substantial share of the conducting layer. It may also be embedded as particles in a matrix of another material which is electrochemically only very slightly reactive. The size of the particles is such that one of their dimensions, preferably their diameter, is approximately between $10^{-6}$ and twice the thickness of the coating, preferably between 1 nm and 10 µm, preferably between 50 nm and 1 µm. The particles are, for example, fibrous or spherical.

Especially with regard to its thickness, conductivity and thermal stability, the protective layer 11 is preferably configured such that, without removing the protective layer 11, the conductor 25 and/or the flat material 100 are or can be electrically contacted, for example by means of connection lines 48 or electrodes 4, with current flowing through the protective layer 11. However, the protective layer 11 may also be removed, at least locally, in order to ensure better contact with the conducting layer 14.

It may be provided that the surface of at least one conductor 25 is coated completely or at least in part with an electrically conductive or even poorly conductive material, in particular completely or at least in part with a plastic and/or a lacquer and/or completely or at least in part with polyurethane, PVC, PTFE, PFA, synthetic rubber, nitrile rubber, nitrile butadiene rubber (commercially also known as "Buna-N" or "Perbunan") and/or polyester. Preferably, the proportion of acrylonitrile in a nitrile rubber is between 18% and 50%. Heating conductors and sensor lines are therefore protected against corrosion and their functionality is not significantly altered when the layer is sufficiently thin.

The coating according to the invention is also particularly suitable for protecting contact conductors, especially such contact conductors as are connected up to a plurality of components to be contacted (e.g. heating conductors) for the electrical contacting thereof. In many instances, contact conductors of this kind cannot be insulated because it would be too tedious to remove the insulation layer again at every contact point.

If such a contact conductor is covered with a coating whose electrical resistance is low and whose corrosion resistance and ability to keep out interfering substances are high, this contact conductor can make electrical contact with numerous consumers along its length, also between its ends, without the insulation having to be removed.

A protective layer 11 of this kind is preferably between 1 and 300 nanometers thick, preferably between 10 and 100. Polyurethane, polyacrylic, polycarbonate, polyester, FR-4, polypropylene and/or polystyrene are particularly suitable for this purpose. During operation, the electrical conductor is preferably connected up for at least some of the time to an electrical voltage of 5-50 V against earth, preferably 12 V±2. The effect of applying this voltage is that when another electrical conductor (e.g. a heating conductor) is arranged in contact with the coated conductor, a breakdown removes the protective layer 11 locally and establishes electrical contact, too, between the two conductors.

Provision may also be made for the protective layer 11 to have a thickness between 300 nanometers and 400 micrometers. In this case it is expediently made, at least in part, of a brittle material, and/or a material that is easily scratched off. It is then possible, in the event of another conductor being placed upon or intersecting the coated conductor, for the protective layer to be removed locally by mechanical loading (e.g. when the heating element is used). To this end, the material of the protective layer 11 preferably has—at least locally—an absolute hardness between 0 and 6.5, preferably between 1 and 5.

Provision may also be made, however, for the protective layer to be electrically conductive. In this case, at least in the area of a contact location, it preferably has a resistance between 0 and 100Ω, preferably 1 mΩ to 50Ω, in the radial direction of the (round) conductor (or perpendicular in the case of planar conductors). Suitable materials for this purpose include, for example, polyurethane, polyester and/or polyacrylic, in each case with added graphite particles and/or precious metal particles. Intrinsically conductive plastics are also suitable. The layer thickness here is preferably between 300 nanometers and 2 millimeters, preferably between 300 nanometers and 50 micrometers, preferably between 300 nanometers and 10 micrometers.

FIG. 2 shows an electrical heating element 20 with a flat heating support 8 and, arranged thereon, a pair of spaced electrodes 4 which are approximately parallel to one another and are mutually connected via a plurality of heating conductors 2. The heating conductors 2 are arranged approximately parallel to one another on the heating support 8, and are connected up electrically in parallel. Provision is made for at least some of the heating conductors 2 to be interlinked. This is achieved by arranging for at least some of the heating conductors 2 to contact each other, at least in some cases electrically, at contact locations 77 between their ends. As a result, localized heating-conductor malfunctions caused, for example, by localized damage during sewing or by vandalism, do not disrupt the operation of the heating element 20 because in the event of a localized failure of individual heating conductors 2, the heating current is distributed to neighboring heating conductors. The electrodes 4, for their part, are connected up to a current source 70 via electrical connection lines 48. Both the heating conductors 2 and the contact conductors 3 may feature a core 13 of solid metal wire (FIG. 2 a). However, they may also feature a support 12 with a conductive layer 14, as shown in FIG. 2 b. Preferably, they are surrounded by a protective layer 11.

It is useful for the heating element to additionally feature a temperature sensor 80 that interrupts a current supply to the heating element 20 at temperatures between 60° C. and 80° C.

It may be expedient for the heating element to be installed in a vehicle seat, a steering wheel, an armrest, a seat pad, an electric blanket, or the like.

FIG. 3 shows a flat material 100 which is composed at least partially, preferably substantially, of conductors 25. At least some of these electrical conductors 25 feature a strand-shaped support 12. This is surrounded by a conductive layer 14. This, in turn, is surrounded by a protective layer 11. A flat, electrically conductive woven material 100 of this kind may be used as a heating textile or, like here, as a sensor electrode 35 in a capacitive sensor 50.

FIG. 4 shows a cross-section through a sensor 50 of this kind. The sensor 50 features two flat materials 100 which serve as sensor electrodes 35, 35' in a capacitor. These are spaced apart from one another by a flat, flexible dielectric 55, composed, for example, of plastic film or leather. The upper and lower sides of the thus-formed capacitor are each covered by a covering layer 44.

The change in the capacitor's capacity caused by compression of the dielectric 55 may then be used to detect a user on a monitored seat surface 32. It is also possible to measure field changes caused by a person approaching one of the sensor electrodes 35.

REFERENCE NUMERALS

2 Heating conductor
3 Contact conductor
4 Electrodes
5 Functional elements
8 Heating support
11 Protective layer
12 Support
14 Conducting layer
20 Heating element
25 Conductor
30 Seat cover
32 Monitored surface
35 Sensor electrode
44 Covering layer
48 Connection lines
50 Sensor
55 Dielectric
60 Keypad
70 Current source
77 Contact locations
80 Temperature sensor
100 Flat material
150 Seat
200 Vehicle

The invention claimed is:

1. A vehicle seat, comprising:
  i. a fabric, and
  ii. an electrical conductor, comprising:
    a) a support made of an electrically non-conductive material;
    b) a thin protective layer; and
    c) a conductor;
  wherein the conductor is made of an electrically conductive material that covers the support, the conductor is at least in part coated with the thin protective layer, which at least locally has a lower specific electrical conductivity than the electrically conductive material of the conductor,
  wherein the protective layer is formed at least in part of nitrile butadiene rubber, the thin protective layer has a thickness between 1 nanometer and 300 nanometers thick, and the thin protective layer is an outermost layer of the electrical conductor,
  wherein at least a part of the electrical conductor is incorporated into the fabric, is fitted on the fabric, is anchored to the fabric, or a combination thereof.

2. The vehicle seat according to claim 1, wherein at least a part of the electrical conductor is:
  (i) formed of a fabric, of a textile, of a nonwoven fabric, of a knitted fabric, of a film, of a strand, or of a thread or a network;
  (ii) incorporated into a fabric, is fitted on a fabric and attached by means of an additional sewing or knitting yarn;
  (iii) bonded at least to one fabric, bonded between two fabrics, or both and the at least one fabric is a textile, a film, a network or comprises a combination thereof and the protective layer is applied at least to parts or components of the fabric; or
  (iv) a combination of (i), (ii), and (iii).

3. The vehicle seat according to claim 1, wherein the support is a strand-like support made of: plastic, a metallizable material, a material which is temperature resistant at least up to 75° C., or a combination thereof.

4. The vehicle seat according to claim 3, wherein the support is made of fibers or filaments.

5. The vehicle seat according to claim 4, wherein the electrically non-conductive material is made of polyurethane, polypropylene, polyethylene, polyamide, or polyethylene therephthalate.

6. The vehicle seat according to claim 3, wherein the support is made of polyurethane, polypropylene, polyethylene, polyamide, or polyethylene therephthalate.

7. The vehicle seat according to claim 6, wherein the electrically non-conductive material is temperature resistant at least up to 1000° C. and
  wherein the specific electrical conductivity is between $62 \times 10^3$ S/m and $10^{-3}$ S/m.

8. The vehicle seat according to claim 7, wherein the protective layer at least in part is composed of a material that is at least conditionally electrically conductive.

9. The vehicle seat according to claim 3, wherein the support is temperature resistant at least up to 500° C.

10. The vehicle seat according to claim 1, wherein the conductor is a conductive layer, which is formed at least in part from:
  (i) a metal;
  (ii) a material whose surface is passivated, oxidized to be passivated, oxidized to be chromated, or a combination of both;
  (iii) which has been applied galvanically onto a support, has a bonded connection with the support, or both; or
  (iv) a combination of (i), (ii), and (iii).

11. The vehicle seat according to claim 10, wherein the conductive layer of the electrical conductor is made at least in part from gold, silver, nickel, chromium, copper, platinum, nickel containing phosphorus fractions, or an alloy of the material.

12. The vehicle seat according to claim 1, wherein at normal operating temperatures the specific electrical conductivity of the conductor, of an electrically conductive components of the conductor, of the protective layer, or a combination thereof is between $100 \times 10^6$ S/m and $10^{-8}$ S/m, and the specific electrical conductivity of the protective layer is at least 10-fold, above the one of conductor, the conductor and conductive components of the conductor, or both respectively.

13. The vehicle seat according to claim 12, wherein the normal operating temperatures are about −20° C. to about 90° C., and
  wherein the specific electrical conductivity is between $62 \times 10^6$ S/m and $10^{-3}$ S/m.

14. The vehicle seat according to claim 1, wherein the electrical conductor is a sensor for monitoring a surface of a vehicle interior by touch, pressure, or both;
  wherein at least one portion of the sensor has the electrical conductor, a fabric, a heating element, or a combination thereof.

15. The vehicle seat according to claim 14, wherein the vehicle seat includes a fabric, a heating element, a sensor, or a combination thereof.

16. The vehicle seat according to claim 1, wherein the conductor is used in a vehicle that has a heating element, a sensor, or both.

17. The vehicle seat according to claim 1, wherein when another electrical conductor having a conductor is in contact with the electrical conductor and a break down of the protective layer occurs, an electrical contact between the conductors is established.

18. The vehicle seat according to claim 1, wherein the conductor when electrically contacted has current flowing through the protective layer.

19. An electrical conductor, comprising:
   a support made of an electrically non-conductive material;
   a thin protective layer; and
   a conductor;
   wherein the conductor is made of an electrically conductive material that covers the support and the conductor is at least in part coated with the thin protective layer,
   wherein the thin protective layer:
   (a) is formed at least in part of nitrile butadiene rubber,
   (b) is an outermost layer of the electrical conductor,
   (c) protects the conductor against functional impairment by corrosion in damp and saline environments, and
   (d) has a thickness between 1 nanometer and 300 nanometers thick so that when electric voltage is applied to the electrical conductor and the electrical conductor is subsequently connected to another electrical conductor, a breakdown locally removes the thin protective layer and establishes electrical contact between the electrical conductor and the another electrical conductor.

20. The electrical conductor according to claim 19, wherein the electrical conductor is a sensor for monitoring a surface of a vehicle interior by touch, pressure, or both, and the sensor is a capacitive sensor with two textile electrodes.

\* \* \* \* \*